G. MILES.
Apparatus for Steaming Wood.

No. 209,179.  Patented Oct. 22, 1878.

Witnesses.
S. N. Piper.
John R. Snow.

Inventor.
George Miles.
by his attorney
R. H. Eddy

UNITED STATES PATENT OFFICE.

GEORGE MILES, OF GRANTVILLE, MASSACHUSETTS.

IMPROVEMENT IN APPARATUS FOR STEAMING WOOD.

Specification forming part of Letters Patent No. 209,179, dated October 22, 1878; application filed September 25, 1878.

*To all whom it may concern:*

Be it known that I, GEORGE MILES, of Grantville, of the county of Norfolk and State of Massachusetts, have invented a new and useful or Improved Apparatus for Steaming Wood or other material; and do hereby declare the same to be described in the following specification and represented in the accompanying drawings, of which—

Figure 1:
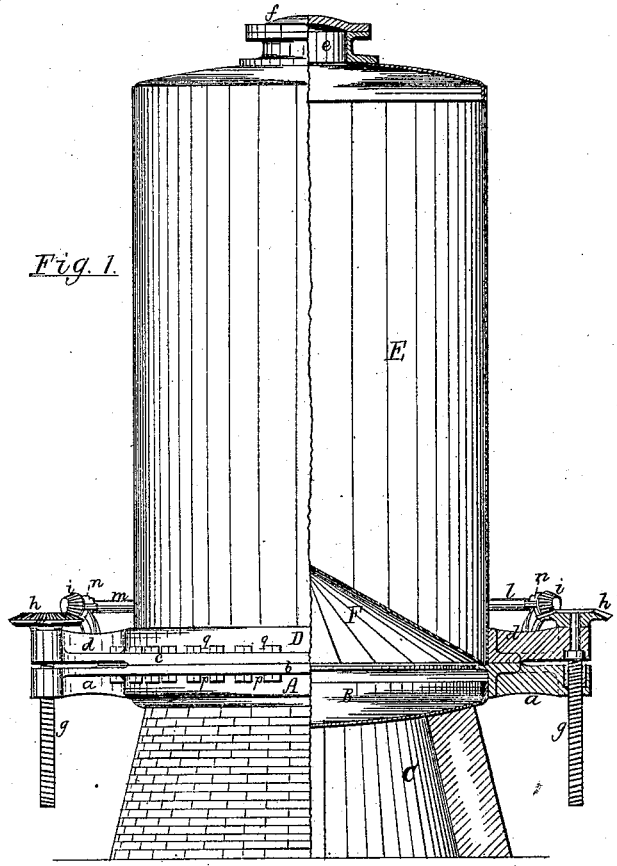
Figure 2:
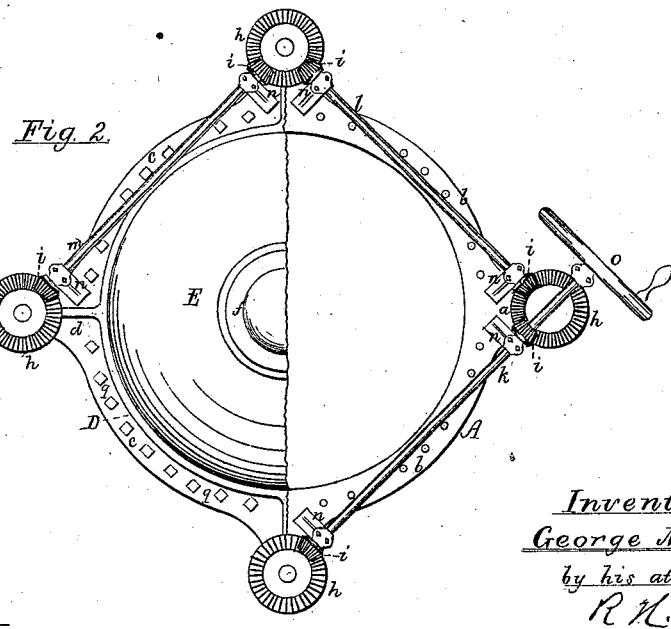

Figure 1 is a sectional elevation, and Fig. 2 a sectional top view, of such apparatus.

My invention, as a whole, embraces cap and base rings, a pan, a hollow cone or deflector, and a keir, open at bottom and provided with screws for elevating and depressing it, all being substantially as hereinafter explained.

In such drawings, A denotes a base-ring, provided with a series of arms, $a$, projecting from it radially. It also has a flange, $b$, extending from it at top and between and from the said arms. This base-ring has fixed to and within it a dish or pan, B, which is supported on a hollow frustum, C, of masonry. Immediately over the said base-ring is another such ring, D, flanged, as shown at $c$, and also provided with a series of arms, $d$, to extend directly and respectively over the arms $a$.

There extends into the cap-ring D a cylindrical vessel or keir, E. This vessel is open at its lower end and is closed at its top, except in there having an open filling-neck, $e$, provided with a cap or cover, $f$, all being as represented. Furthermore, there rests on the top of the base-ring A a hollow perforated cone, F, which is extended up within the keir, in manner as shown.

Each arm $d$ has a long screw, $g$, pivoted within it and screwed into and through the arm $a$, directly underneath it. Each of such screws has fixed on it at its upper end a bevel-gear, $h$. These gears engage with a series of bevel-pinions, $i\ i\ i\ i\ i\ i$, fastened on three horizontal shafts, $k\ l\ m$, arranged as represented, such shafts being supported in bearings or standards $n$, erected on the cap-ring. A crank-wheel, $o$, is fixed on the outer end of the shaft $k$. By turning such wheel all the screws will be simultaneously revolved, so as to cause the cap-ring and keir to be raised relatively to the base-ring and the deflector or cover F. In order to fasten the cap-ring down tightly upon the base-ring, a series of screw-bolts, $p$, and nuts $q$ are used, the nuts going through the two flanges of such rings.

In using the apparatus, the keir, after having been fastened down by means of the bolts and nuts of the cap and base rings, is to be charged with the wood, rags, or other matter to be steamed, after which it is to be closed at top and steam is to be let in by proper means. After the steaming operation has been carried on for a suitable period of time, the cap-ring and keir are to be raised upward by their elevating mechanism. While they are being so raised the charge will be discharged from the keir at its lower end, the escape of the charge being facilitated or occasioned by the perforated cone. The condensed liquid and the extracts from the charge will flow down through the cone and be received into the dish or pan beneath it, from whence they may be extracted by a suitable pipe or conduit leading from it.

I claim as my invention as follows—that is to say:

1. The keir open at bottom, in combination with the pan and mechanism for moving the keir vertically on and off the pan, as described.

2. The kier open at bottom, in combination with the perforated cone or discharger, the pan and mechanism for moving the keir vertically on and off the said pan, as explained.

3. The cap and base rings, provided with arms and elevating-screws, as described, in combination with the pan and the kier arranged with such rings, as set forth.

4. The cap and base rings, provided with arms and elevating-screws, as described, in combination with the pan and kier, and with the perforated cone or discharger arranged over the said pan and on the base-ring and within the keir, all being essentially as represented.

GEORGE MILES.

Witnesses:
R. H. EDDY,
JOHN R. SNOW.